United States Patent [19]

Baba et al.

[11] Patent Number: 5,702,762
[45] Date of Patent: Dec. 30, 1997

[54] MANUFACTURING METHOD OF AN ACTIVE MATERIAL SUITABLE FOR NON-SINTERED NICKEL ELECTRODES FOR USE IN ALKALINE STORAGE CELLS

[75] Inventors: Yoshitaka Baba, Naruto; Motoo Tadokoro, Itano-gun; Akifumi Yamawaki, Naruto, all of Japan

[73] Assignee: Sanyo Electric Co., Ltd., Moriguchi, Japan

[21] Appl. No.: 665,703

[22] Filed: Jun. 18, 1996

[30] Foreign Application Priority Data

Jul. 4, 1995 [JP] Japan ................... 7-168563
Mar. 12, 1996 [JP] Japan ................... 8-054809

[51] Int. Cl.$^6$ ............. B05D 7/00; B05D 3/12; B05D 1/02
[52] U.S. Cl. ............ 427/212; 427/213; 427/215; 427/346; 427/372.2; 427/422; 427/424
[58] Field of Search ............ 427/212, 213, 427/215, 346, 355, 372.2

[56] References Cited

U.S. PATENT DOCUMENTS

| | | | |
|---|---|---|---|
| Re. 34,752 | 10/1994 | Oshitani et al. | 429/223 |
| 3,752,706 | 8/1973 | Melin | 136/24 |
| 4,049,027 | 9/1977 | Seiger | 141/1.1 |
| 4,844,999 | 7/1989 | Oshitani et al. | 429/223 |

FOREIGN PATENT DOCUMENTS 1-200555  8/1989  Japan.
6-38336   5/1994  Japan.

OTHER PUBLICATIONS

Blanchard et al.; WO 91/20101, translation of abstract and Figure 1, Dec. 26, 1991.

Tamagawa et al.; JP 04109557, translation of abstract, Apr. 10, 1992.

Nakahori; DE 3806943, translation of abstract, Sep. 15, 1988.

Exhov et al.; *Structure Modification and Change of Electrochemical Activity of Nickel Hydroxides;* J. Electrochem. Soc., vol. 138, No. 4; Apr. 1991; pp. 885–889.

*Primary Examiner*—Michael Lusignan
*Assistant Examiner*—Bret Chen
*Attorney, Agent, or Firm*—Armstrong, Westerman, Hattori, McLeland & Naughton

[57] ABSTRACT

In a method of manufacturing a nickel active material, nickel hydroxide particles coated with cobalt hydroxide are put on the mesh disk 4 of the fluidized granulator 1. Then, hot air is continuously supplied from outside through the hot air inlet 5, while air inside the fluidized granulator 5 is continuously emitted through the air outlet 8. At the same time, the nickel hydroxide particles are stirred with the stirring fan 3 and further dispersed by a hot air current. In this condition, an alkali aqueous solution is sprayed on the nickel hydroxide particles through the spray nozzle 7 by the pump 9. After the spray, the nickel hydroxide particles are further stirred in hot air so as to complete an alkali heat treatment.

4 Claims, 3 Drawing Sheets

MANUFACTURING METHOD OF AN ACTIVE MATERIAL SUITABLE FOR NON-SINTERED NICKEL ELECTRODES FOR USE IN ALKALINE STORAGE CELLS

BACKGROUND OF THE INVENTION

(1) Field of the Invention

The present invention relates to a manufacturing method of an active material suitable for nickel electrodes for use in alkaline storage cells, the active material being particularly suitable for non-sintered nickel electrodes.

(2) Related Art

Nickel electrodes for use in alkaline storage cells are impregnated with an active material which contains nickel hydroxide as a main component. Besides conventional sintered nickel electrodes, non-sintered nickel electrodes are manufactured by impregnating a substrate such as foamed nickel with active material powder or by coating a punching metal with active material paste.

Nickel electrodes are used as positive electrodes in alkaline storage cells such as nickel-cadmium secondary cells and nickel-hydrogen secondary cells. Since these alkaline storage cells are generally used as the power sources of portable electronics appliances, there has been a great demand for cells with larger capacities.

With regard to cell capacities, non-sintered nickel electrodes have a larger filling density of an active material, but generally have a lower utilization factor of the active material than sintered nickel electrodes. However, various techniques have been developed to improve this low utilization factor of non-sintered nickel electrodes and so increase cell capacities such as mixing particles which are mainly composed of nickel hydroxide (these particles are hereinafter referred to as nickel hydroxide particles) with cobalt or a cobalt compound, coating nickel hydroxide particles with cobalt compound precipitates, or oxidizing nickel hydroxide particles coated with cobalt compound precipitates in hydrogen peroxide water.

Once a nickel positive electrode which is impregnated with an active material containing cobalt or a cobalt compound is used in an alkaline storage cell, these cobalt species dissolve in the electrolyte and uniformly disperse across the surfaces of nickel hydroxide particles. At the initial charge of the cell, the cobalt species precipitate while functioning as connectors between adjacent nickel hydroxide particles or between nickel hydroxide particles and the current collector. Then, this precipitate changes into cobalt oxyhydroxide whose conductive network is considered to enhance the conductivity between adjacent nickel hydroxide particles and between nickel hydroxide particles and the current collector, which in turn enhances the utilization factor of active material.

However, an alkaline storage cell which is assembled with a positive electrode impregnated with such a nickel active material has the following problem during an over-charge. A cobalt compound penetrates nickel hydroxide particles, and as a result, the effects of the cobalt compound are lost and the improvement in the utilization factor of the active material cannot be maintained.

To overcome the problem, the inventors of the present invention earlier filed commonly assigned application (U.S. Ser. No. 08/529,980) which discloses the following features: nickel hydroxide particles coated with a cobalt compound are subjected to a heat treatment in an oxygen atmosphere with alkali (hereinafter referred to as alkali heat treatment), so as to coat the nickel hydroxide particles with a cobalt oxide which has an oxidation number greater than 2. As a result, the conductivity of the active material is improved and favorable change is made in the state of the fine pores of nickel hydroxide particles, so that the over-discharge characteristics are improved.

Here, the specific process of the alkali heat treatment consists of impregnating nickel hydroxide particles coated with a cobalt compound with an alkali aqueous solution, and heating the nickel hydroxide particles in air.

However, this method has the following problem. In the heating operation, the cobalt compound causes nickel hydroxide particles to agglomerate, so that the manufactured active material contains some undesired agglomerates.

Since it is hard to impregnate a positive electrode with an active material containing such agglomerates, the active material is pulverized to break the agglomerates into pieces. However, the cobalt compound which coats the nickel hydroxide particle surfaces comes off in part during the pulverization, and as a result, the effects of the alkali heat-treated cobalt compound for improving the utilization factor of an active material is deteriorated during a high-rate discharge.

SUMMARY OF THE INVENTION

In view of these problems, the object of the present invention is to provide a manufacturing method of a nickel active material which contains nickel hydroxide particles and a cobalt compound which coats the surfaces of the nickel hydroxide particles, the manufacturing method restraining the occurrence of agglomeration of the nickel hydroxide particles during an alkali heat treatment, which in turn improves the cell characteristics including the utilization factor of an active material and high-rate discharge characteristics.

The object is achieved by providing the following manufacturing method of a nickel electrode active material for use in an alkaline storage cell: the method comprises the steps of mixing particles with an alkali aqueous solution, the particles being mainly composed of nickel hydroxide and being coated with a cobalt compound, and of heating the particles which have been mixed with the alkali aqueous solution in a presence of oxygen. In this method, the particles which have been mixed with the alkali aqueous solution may be continuously stirred or dispersed during the heating step, or the alkali aqueous solution may be sprayed on the particles while the particles are stirred or dispersed in hot air during the mixing step.

The above method has successfully prevented the agglomeration of nickel hydroxide particles either by continuously stirring nickel hydroxide particles mixed with an alkali aqueous solution throughout a heating operation or by spraying an alkali aqueous solution on nickel hydroxide particles while they are being stirred or dispersed in the air. The sprayed alkali aqueous solution evaporates so soon that adjacent nickel hydroxide particles are not agglomerated.

Thus, since the present invention requires fewer pulverizing operations of nickel hydroxide particles agglomerates, the coming off of a cobalt compound is reduced. Consequently, the utilization factor of an active material and the high-rate discharge characteristics of a positive electrode are improved.

During the mixing step, the particles may be held on a porous holder, and the alkali aqueous solution may be sprayed on the particles which are being held on the porous holder while hot air is supplied from under the holder through pores of the holder.

During the mixing step, the alkali aqueous solution may be sprayed on the particles which are being held on the porous holder while the particles are mechanically stirred.

The ratio of a cobalt compound to the nickel hydroxide contained in the particles may be between 1% by weight and 14% by weight in terms of cobalt hydroxide.

The concentration of the alkali aqueous solution may be between 10% by weight and 40% by weight.

The heating step may be performed at a temperature of between 40° C. and 150° C.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

EMBODIMENT 1

A mixture aqueous solution containing nickel, zinc, and cobalt in a mole ratio of 1:0.02:0.02 was prepared by mixing a nickel sulfate aqueous solution, a zinc sulfate aqueous solution, and a cobalt sulfate aqueous solution. While stirring the mixture aqueous solution, a sodium hydroxide aqueous solution was added drop by drop, with the pH being constantly adjusted at 13 to 14. As a result, nickel hydroxide crystal in which a slight amount of zinc and cobalt were added as a solid-solution was precipitated.

Then, while stirring the aqueous solution containing the precipitated nickel hydroxide crystal, a cobalt sulfate aqueous solution whose specific gravity was 1.30 and a 25% by weight of sodium hydroxide aqueous solution were added drop by drop, while keeping the pH at 9 to 10, so as to generate nickel hydroxide particles which are composed of nickel hydroxide crystals as their nucleuses and cobalt hydroxide precipitate over the nickel hydroxide crystal surfaces.

The amount of cobalt hydroxide to be precipitated over the nickel hydroxide crystal surfaces can be adjusted by changing the concentration of the cobalt sulfate aqueous solution to be added and also the time period of keeping the pH at 9 to 10.

The generated nickel hydroxide particles were taken out, washed, and dried. While stirring the dried particles with a hot air current in the manner which will be explained below, a sodium hydroxide aqueous solution was sprayed on the nickel hydroxide particles as an alkali heat treatment, so as to manufacture an active material.

Figure 1:
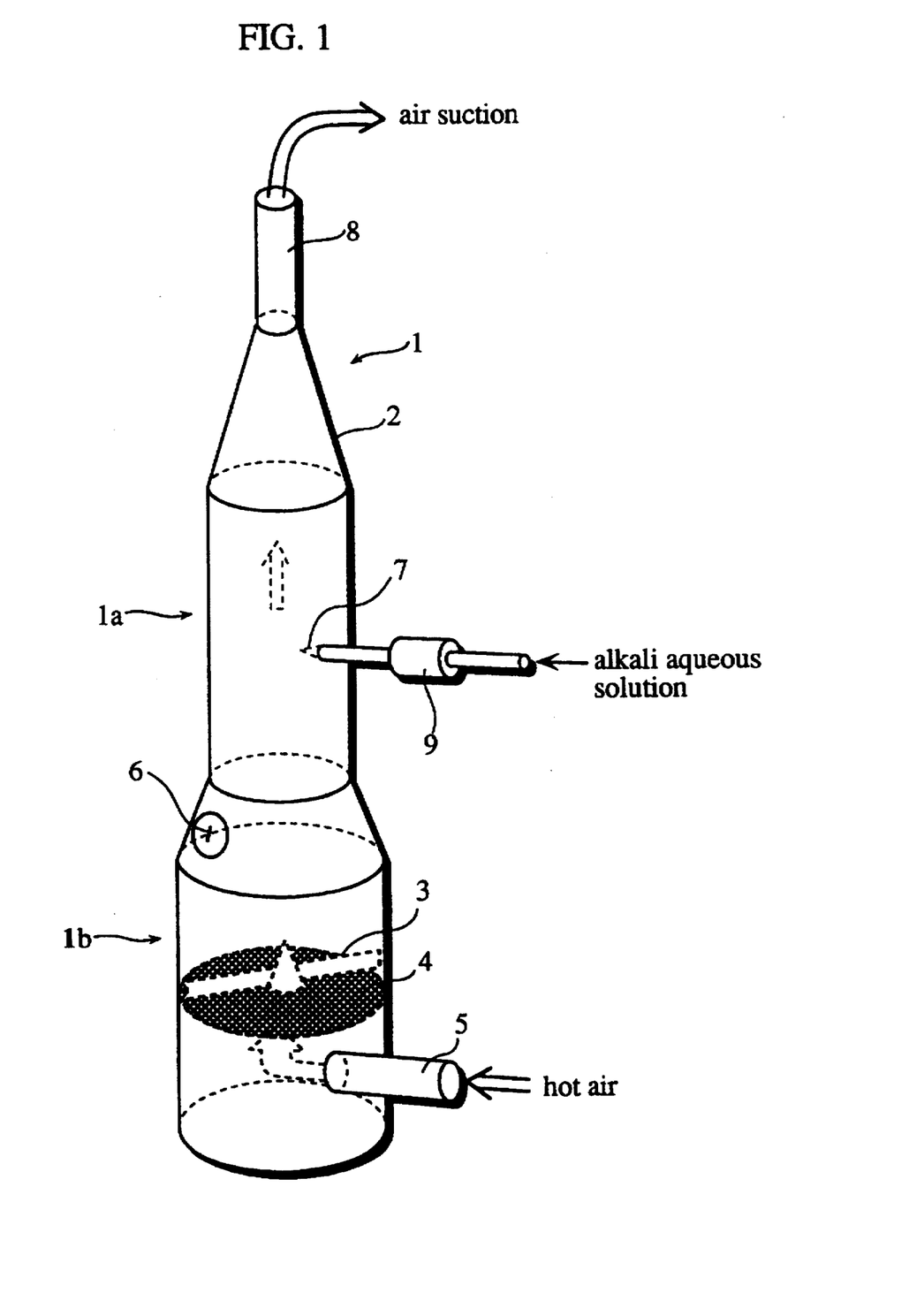
FIG. 1 shows a diagrammatic sketch of the fluidized granulator used in the first embodiment.

FIG. 1 is a diagrammatic sketch of the fluidized granulator used in the present embodiment. As the fluidized granulator 1, the "Agglo master" multi-purpose fluidized dryer manufactured by Hosokawa Micron is used in the present embodiment. The fluidized granulator 1 is composed of a cylindrical top unit 1a and a larger cylindrical bottom unit 1b. The entire surface of the fluidized granulator 1 is covered with an outer board 2. Air can travel in the vertical direction inside the fluidized granulator 1.

The bottom unit 1b includes a stirring fan 3 which is provided at the longitudinal center for stirring nickel hydroxide particles, a mesh disk 4 with a 2 μm pitch which is provided beneath the stirring fan 3 for preventing nickel hydroxide particles from falling, a hot air inlet 5 which is provided at the lower part section for supplying hot air from an unillustrated external hot air blower, and a slot 6 which is provided at the higher part section for inserting nickel hydroxide particles.

The top unit 1a includes a spray nozzle 7 which is provided in the longitudinal center for spraying a sodium hydroxide aqueous solution on nickel hydroxide particles while they are being stirred by the stirring fan 4 and an air outlet 8 which is provided at the end for emitting air inside the fluidized granulator 1 by an unillustrated external suction device. The spray nozzle 7 is designed to be connected to a pump 9 to convey the sodium hydroxide aqueous solution.

An alkali heat treatment with the use of the fluidized granulator 1 is carried out as follows. Nickel hydroxide particles with cobalt hydroxide precipitate thereon are put into the fluidized granulator 1 through the slot 6 and on the mesh disk 4.

Then, a hot air is supplied through the hot air inlet 5, while the air inside the fluidized granulator 1 is emitted through the air outlet 8. As a result, hot air goes up through the mesh disk 4 as shown in the arrow. This ascendant hot air heats the nickel hydroxide particles on the mesh disk 4.

Then, the stirring fan 3 is rotated so as to stir the nickel hydroxide particles on the mesh disk 4. The nickel hydroxide particles are dispersed in the hot air all over the fluidized granulator 1.

The pump 9 is started to spray a predetermined amount of a sodium hydroxide aqueous solution through the spray nozzle 7. The sodium hydroxide aqueous solution sprayed on the surfaces of the dispersed nickel hydroxide particles penetrates the cobalt hydroxide precipitate. The sodium hydroxide aqueous solution which has been uniformly dispersed on the nickel hydroxide particles reacts with the hot air, and as a result, the cobalt hydroxide precipitate over the surfaces has a larger oxidation number.

The amounts of air to be emitted from the fluidized granulator 1 and hot air to be supplied from outside are adjusted so that an appropriate amount of nickel hydroxide particles is blown off. The temperature of the hot air is adjusted so that the temperature of an air current in the vicinity of the nickel hydroxide particles which are being stirred is kept at an appropriate level.

The amount of the sodium hydroxide aqueous solution to be sprayed is determined so that a sufficient amount of the solution is dispersed and penetrates the entire surfaces of the nickel hydroxide particles. The present embodiment uses a sodium hydroxide aqueous solution which contains 5 parts by weight of sodium hydroxide to 95 parts by weight of nickel hydroxide particles. For example, when a 25% by weight of sodium hydroxide aqueous solution is prepared, 5 parts by weight of sodium hydroxide is dissolved in 15 parts by weight of water.

After the sodium hydroxide aqueous solution is sprayed in about 10 minutes, the nickel hydroxide particles are further stirred for about 15 minutes in the hot air current. This is the completion of the alkali heat treatment.

After the alkali heat treatment, the operation of the fluidized granulator 1 is suspended, and the resultant nickel hydroxide particles, that is, a manufactured active material are taken out from the slot 6.

The amount of cobalt to be contained in the manufactured active material is measured as follows. The active material is dissolved in an acid water, and the ratio between Ni and Co in this solution is measured by an ICP spectrometer. Assuming that the active material is composed of nickel hydroxide and cobalt hydroxide, the percentage by weight of cobalt hydroxide to the entire weight of the active material is calculated, based on the measured ratio of Ni and Co, and the obtained value is regarded as the amount of cobalt.

The average oxidation number of the high-ordered cobalt oxide is measured as follows, based on the fact that bivalent cobalt oxide can dissolve in nitrate, whereas trivalent cobalt oxide hardly dissolves in nitrate, because the high-order cobalt oxide which has been subjected to the alkali heat treatment is considered to consist of bivalent cobalt oxide and trivalent cobalt oxide.

Firstly, a predetermined amount of the alkali heat-treated nickel hydroxide particles is washed with a nitrate solution, and the amount of cobalt which has been dissolved in this acid solution is measured with an ICP spectrometer and regarded as the amount of bivalent cobalt. Secondly, the same amount of alkali heat-treated nickel hydroxide particles is washed with a hydrochloric acid solution, and the amount of cobalt which has been dissolved in this acid solution is measured with an ICP spectrometer and regarded as the total amount of cobalt contained in the active material. The difference between the total amount of cobalt and the amount of divalent cobalt is regarded as the amount of trivalent cobalt. Finally, the average oxidation number is calculated from the amounts of divalent cobalt and trivalent cobalt.

Although nickel hydroxide particles are stirred with the stirring fan 3 during the alkali heat treatment in the present embodiment, if the amount of the particles is small, the stirring can be performed only by blowing the particles off with hot air.

EMBODIMENT 2

In the same manner as in the first embodiment, nickel hydroxide particles which were composed of nickel hydroxide crystals as their nucleuses and cobalt hydroxide precipitate over the nickel hydroxide crystal surfaces were manufactured.

The manufactured nickel hydroxide particles were subjected to an alkali heat treatment by spraying a sodium hydroxide aqueous solution on the nickel hydroxide particles while stirring them with a kneader and at the same time heating them by a heater. As a result, an active material was manufactured.

Figure 2:
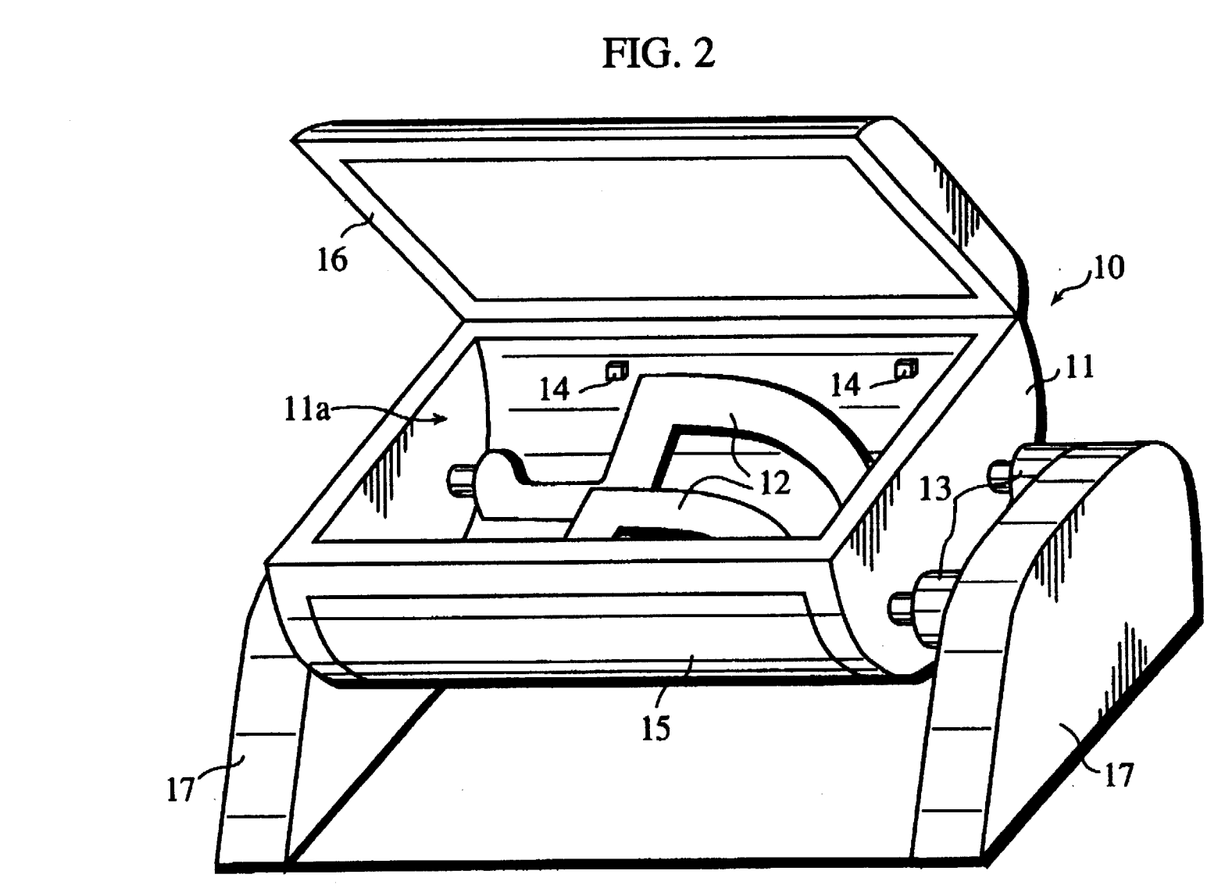
FIG. 2 shows a diagrammatic sketch of the kneader used in the second embodiment.

FIG. 2 shows a diagrammatic sketch of the kneader 10 used in the present embodiment. This kneader 10 is composed of a container 11, a pair of blades 12, a motor 13, a pair of spray nozzles 14, a heater 15, a cover 16, and a kneader supporter 17. The two blades 12 are rotated in the opposite direction to each other by the motor 13, thereby mixing nickel hydroxide particles put in the container 11. The spray nozzles 14 are provided at the upper part of the container 11, and the heater 15 is provided on the external surface of the container 11. The kneader supporter 17 sustains the container 11 to be turned upside-down.

The alkali heat treatment with the use of the kneader 10 is carried out as follows. Firstly, nickel hydroxide particles are inserted through the opening 11a of the container 11. The level of the nickel hydroxide particles must be below the spray nozzles 14. After the cover 16 is shut, the blades 12 are started to rotate, and the heater 15 starts to heat the container 11. The rotation speed of the blades 12 is adjusted so that the nickel hydroxide particles are dispersed properly in the container 11. When the temperature inside the container 11 reaches a predetermined degree, a sodium hydroxide aqueous solution started to be sprayed through the spray nozzles 14. Thus, the nickel hydroxide particles are mixed with the sodium hydroxide aqueous solution while they are being dispersed in the hot air. The amount of the spray is determined in the same manner as in the first embodiment.

After the spraying operation, the nickel hydroxide particles are stirred in the hot air for another 15 minutes. This is the completion of the alkali heat treatment. Then, the rotation of the blades 12 is suspended, the cover 16 is opened, and the container 11 is turned upside-down to take the nickel hydroxide particles out.

EMBODIMENT 3

In the same manner as the first and second embodiments, nickel hydroxide particles which were composed of nickel hydroxide crystals as their nucleuses and cobalt hydroxide precipitate over the nickel hydroxide crystal surfaces were manufactured.

While stirring the nickel hydroxide particles with a mixer and blowing them with hot air, a sodium hydroxide aqueous solution was sprayed on them. As a result, an active material was manufactured.

Figure 3:
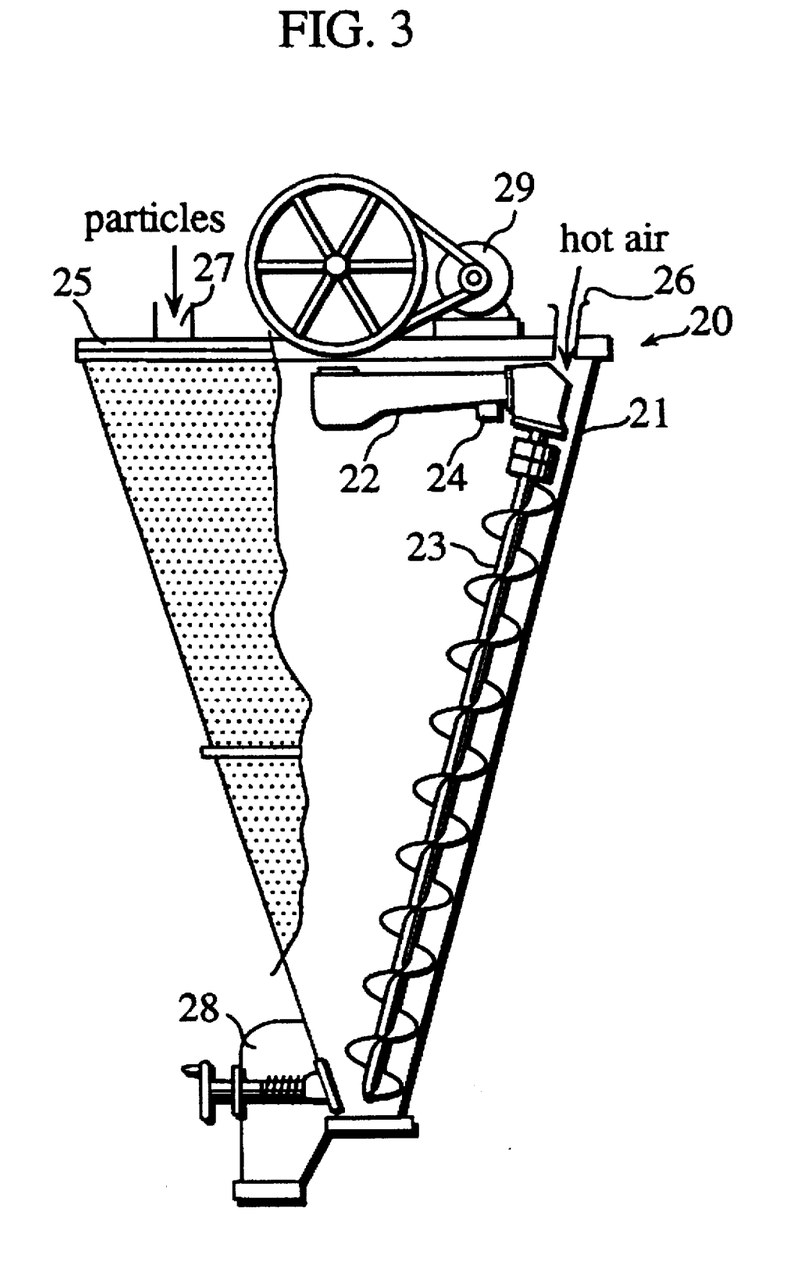
FIG. 3 shows a diagrammatic sketch of the mixer used in the third embodiment.

FIG. 3 shows a diagrammatic sketch of the mixer 20 used in the present embodiment. As the mixer 20, the "Nauta mixer" manufactured by Hosokawa Micron is used in the present embodiment.

The mixer 20 is composed of a conical container 21, a swing arm 22, a screw 23, a motor 29, a spray nozzle 24, and a cover 25. The screw 23 rotates on its own axis and also in accordance with the swing arm 22. The motor 29 drives the swing arm 22 and the screw 23. The spray nozzle 24 is provided at the end of the swing arm 22 for spraying a sodium hydroxide aqueous solution through it. The cover 25 is provided with an air inlet 26 for supplying hot air and a slot 27 for putting nickel hydroxide particles in. The mixer 20 is further provided with an unillustrated heater on its external surface and an outlet 28 near the base thereof for discharging the contents of the container 21 continuously. The spray nozzle 24 is supplied with a sodium hydroxide aqueous solution from outside the cover 25 through the inside of the swing arm 22.

The alkali heat treatment with the use of the mixer 20 is carried out as follows. While heating the container 21 by the heater, hot air is supplied through the air inlet 26, keeping the inside of the container 21 at a predetermined temperature. The swing arm 22 and the screw 23 are started to rotate. While spraying a sodium hydroxide aqueous solution through the spray nozzle 24, nickel hydroxide particles are continuously supplied through the slot 27 and continuously emitted through the outlet 28. During this, nickel hydroxide particles in the container 21 are stirred by the screws 23 in the hot air, mixing with the sodium hydroxide aqueous solution spray.

The amount of nickel hydroxide particles to be kept in the container 21 is adjusted to around 20% of the capacity of the container 21. The amount of nickel hydroxide particles to be supplied per unit time is so adjusted as to keep the adjusted amount of nickel hydroxide particles in the container 21 for a time period necessary to complete the alkali heat treatment (for example 20 minutes). The amount of the sodium hydroxide aqueous solution to be sprayed is adjusted in the same manner as in the first embodiment. Consequently, the nickel hydroxide particles are continuously subjected to the alkali heat treatment.

EMBODIMENT 4

In the present embodiment, nickel hydroxide particles are soaked in a sodium hydroxide aqueous solution, instead of spraying the solution on the particles, and then the particles are stirred in the hot air.

In the same manner as the first, second, and third embodiments, nickel hydroxide particles which were composed of nickel hydroxide crystals as their nucleuses and cobalt hydroxide precipitate over the nickel hydroxide crystal surfaces were manufactured.

The nickel hydroxide particles thus manufactured were washed with water, dried, soaked in a sodium hydroxide aqueous solution, and stirred in a beaker for 0.5 hours while being heated.

EXAMPLE 1

An active material A1 was manufactured in the same manner as the first embodiment using the fluidized granulator 1 under the conditions that the amount of water contained in the nickel hydroxide particles was about 10% by weight, the concentration of a sodium hydroxide aqueous solution used for the alkali heat treatment was 25% by weight, the temperature at the heat treatment was 80° C., and the amount of cobalt was 10% by weight, as shown in Table 1.

The nickel hydroxide particles of the active material A1 were regular in sizes and hardly agglomerated. All the nickel hydroxide particles were found to pass through a 150 μm sieve of 100 mesh.

EXAMPLE 2

An active material A2 was manufactured in the same manner as the second embodiment using the kneader 10 under the conditions that the amount of water contained in the nickel hydroxide particles was about 10% by weight, the concentration of a sodium hydroxide aqueous solution used for the alkali heat treatment was 25% by weight, the temperature at the heat treatment was 80° C., the amount of cobalt was 10% by weight, the amount of nickel hydroxide particles was about 40% of the capacity of the container 11, and the rotation speed of the blades 12 was about 10 rpm.

The nickel hydroxide particles of the active material A2 were regular in sizes and hardly agglomerated. Here 1% or less of the nickel hydroxide particles were caught by a 150 μm sieve of 100 mesh.

EXAMPLE 3

An active material A3 was manufactured in the same manner as the third embodiment using the mixer 20 under the conditions that the amount of water contained in the nickel hydroxide particles was about 10% by weight, the concentration of a sodium hydroxide aqueous solution used for the alkali heat treatment was 25% by weight, the temperature at the heat treatment was 80° C., the amount of cobalt was 10% by weight, and the rotation speed of the screw 23 was about 20 rpm.

The nickel hydroxide particles of the active material A3 were regular in sizes and hardly agglomerated. Here 1% or less of the nickel hydroxide particles were caught by a 150 μm sieve of 100 mesh.

EXAMPLE 4

An active material A4 was manufactured in the same manner as the fourth embodiment under the conditions that the amount of water contained in the nickel hydroxide particles was about 10% by weight, the concentration of a sodium hydroxide aqueous solution used for the alkali heat treatment was 25% by weight, the temperature at the heat treatment was 80° C., and the amount of cobalt was 10% by weight.

It was found that the nickel hydroxide particles were agglomerated in part. Here, 5% or less of the nickel hydroxide particles were caught by a 150 μm sieve of 100 mesh.

The nickel hydroxide particles containing some agglomerates were pulverized by a pulverizer into pieces fine enough to be used to fill a positive electrode. Through an observation with SEM photograph, it was found that the cobalt compound layer over the surfaces of the nickel hydroxide particles came off in some parts.

EXAMPLE 5

Active materials B0, B1, B2, B3, B4, B5, B6, and B7 shown in Table 2 were manufactured in the same manner as the first embodiment using the fluidized granulator 1 under the conditions that the amount of water contained in the nickel hydroxide particles was about 10% by weight, the concentration of a sodium hydroxide aqueous solution used for the alkali heat treatment was 25% by weight, the temperature at the heat treatment was 80° C., and the amount of cobalt was varied in the 0.5% to 16% by weight range.

The nickel hydroxide particles of these active materials B0–B7 thus manufactured were regular in sizes and hardly agglomerated.

EXAMPLE 6

Active materials C0, C1, C2, C3, C4, and C5 shown in Table 3 were manufactured in the same manner as the first embodiment using the fluidized granulator 1 under the conditioner, that the amount of water contained in the nickel hydroxide particles was about 10% by weight, the temperature at the heat treatment was 80° C., the amount of cobalt was 10% by weight, and the concentration of a sodium hydroxide aqueous solution used for the alkali heat treatment was varied in the 7% to 45% by weight range.

The nickel hydroxide particles of these active materials C0–C5 thus manufactured were regular in sizes and hardly agglomerated.

EXAMPLE 7

Active materials D0, D1, D2, D3, D4, D5, and D6 shown in Table 4 were manufactured in the same manner as the first embodiment using the fluidized granulator 1 under the conditions that the amount of water contained in the nickel hydroxide particles was about 10% by weight, the concentration of a sodium hydroxide aqueous solution used for the alkali heat treatment was 25% by weight, the amount of cobalt was 10% by weight, and the temperature at the heat treatment was varied in the 35° C. to 160° C. range.

The nickel hydroxide particles of these active materials D0–D6 thus manufactured were regular in sizes and hardly agglomerated.

It is considered that all of the active materials A1–A3, B0–B7, C0–C5, and D0–D6 are nickel hydroxide particles which are composed of nickel hydroxide crystals as their nucleuses and cobalt hydroxide whose oxidation number is larger than 2 over the nickel hydroxide crystal surfaces. It is also considered that through the alkali heat treatment, favorable change is made in the state of the pores of the nickel hydroxide particles, so as to improve the over-discharge characteristics.

Comparative Example

In the same manner as the first, second, and third embodiments, nickel hydroxide particles which were composed of nickel hydroxide crystals as their nucleuses and cobalt hydroxide precipitate over the nickel hydroxide crystal surfaces were manufactured.

The manufactured nickel hydroxide particles were washed with water, dried, soaked in a 25% by weight sodium hydroxide aqueous solution, evenly spread over filter paper, and subjected to an alkali heat treatment for 0.5 hours at a temperature of 80° C.

It was found that the alkali heat-treated nickel hydroxide particles were agglomerated in many parts. Here, about 50% of the nickel hydroxide particles were caught by a 150 μm sieve of 100 mesh.

The nickel hydroxide particles were pulverized by a pulverizer so as to form an active material Y. The amount of cobalt which was contained in the active material Y was 10% by weight.

Through an observation with SEM photograph, it was found that the cobalt compound layer over the surfaces of the nickel hydroxide particles came off in some parts.

EXPERIMENT

The average oxidation number of each of the active materials A1–A4, B0–B7, C0–C5, D0–D6, and Y was measured in the same manner as in the first embodiment. All the examples exhibited substantially the same value of 2.9 or so. For comparison, the average oxidation number of a standard cobalt hydroxide crystal was measured in the same manner, and the obtained value was 2.0. In addition, the measurement was conducted by an electro-chemical method, and a similar value was obtained.

It is concluded that in all the active materials A1–A4, B0–B7, C0–C5, D0–D6, and Y, most cobalt hydroxide precipitated over the nickel hydroxide particle surfaces was converted into a cobalt oxide whose oxidation number was 3, through the alkali heat treatment.

These active materials A1–A4, B0–B7, C0–C5, D0–D6, and Y were subjected to the following electrode test and cell performance test. The electrode test consists of the measurement of the utilization factor of an electrode, and the cell performance test consists of the measurements of (1) cell capacity per unit active material and (2) high-rate discharge characteristics, which includes a) 2C discharge and b) 4C discharge.

Electrode Test

The utilization factor of an electrode was measured for each of the active materials B0–B7, C0–C5, and D0–D6 as follows. Firstly, 100 parts by weight of an active material were mixed with 50 parts by weight of a 0.2% by weight hydroxypropyl cellulose aqueous solution so as to prepare an active material slurry solution. The active material slurry solution was used to fill foamed nickel having 95% porosity and 1.6 mm thickness, dried, and rolled to a thickness of 0.60 mm to form a nickel electrode used for the electrode test. The amount of the active material filled in the foamed nickel was calculated from the theoretical amount of nickel hydroxide contained in the active material so that the theoretical capacity of the electrode was set at 1200 mAh.

Open cells were assembled with the nickel electrodes which were prepared for the electrode test, nickel plates as opposing electrodes, and an about 25% by weight KOH aqueous solution. These cells were charged for 24 hours with a current of 120 mA, and discharged with a current of 400 mA until the discharge termination voltage of –0.8V was reached on a base of the nickel boards. Here, the discharge capacities were measured, and the utilization factors of these electrodes were calculated by the following equation:

$$\text{Utilization factor of an electrode} = \frac{\text{discharge capacity}}{\text{theoretical capacity of the electrode}}$$

Cell Performance Test

Cells used for the cell performance test were assembled using each of the active materials A1–A3 and Y.

The positive electrodes for the cells were manufactured in the same manner as in the electrode test. The nominal capacity of these positive electrodes was set at 1200 mAh. All the positive electrodes used the same amount of active material which was calculated from the nominal capacity on the assumption that all active materials were exclusively composed of nickel hydroxide.

The negative electrodes for the cells were manufactured as follows. Mish metal (Mm), nickel, cobalt, aluminum, and manganese were mixed in a ratio of 1.0:.3.6:0.6:0.2:0.6, and this mixture was melted into an alloy melt in a high frequency induction furnace under an argon gas atmosphere. The alloy melt was cooled so as to form an ingot which was expressed by the formation equation $Mm_{1.0}Ni_{3.6}Co_{0.6}Al_{0.2}Mn_{0.6}$. The ingot was pulverized into a hydrogen-absorbing alloy whose average particle diameter was about 100 μm. The hydrogen-absorbing alloy was mixed with a binder such as a polyethyle oxide and an appropriate amount of water so as to generate a hydrogen-absorbing alloy paste. This paste was spread on both sides of punching metal, dried, and rolled to a thickness of 0.4 mm to form negative electrodes. Then, one of these positive electrodes and one of these negative electrodes were stacked with a separator therebetween, rolled up, and inserted into a cylindrical outer casing into which alkali electrolyte was poured. As a result, cylindrical sealed nickel-hydrogen storage cells of AA size were manufactured. A KOH aqueous solution of 7 to 8.5N was used as the alkali electrolyte, and nylon unwoven cloth was used as the separator. The theoretical capacities of these cells were normalized by the positive electrodes and the capacities of the negative electrodes were set at about 1.5 times those figures.

(1) Measurement of Cell Capacity Per Unit Active Material

The cells manufactured for the cell performance test were charged for 16 hours with a current of 120 mA, then discharged with a current of 240 mA until the discharge termination voltage of 1.0V was reached. Here, the discharge capacities were measured. Then, each cell capacity per unit active material was calculated by the following equation, in which active material weight indicates the total weight of each active material including a cobalt compound:

$$\text{capacity of unit active material} = \frac{\text{discharge capacity}}{\text{active material weight}}$$

(2) High-Rate Discharge Characteristics a) 2C Discharge

Each of the cells manufactured for the cell performance test was charged for 16 hours with a current of 120 mA, then discharged at 2400 mA until the discharge termination voltage reaches 1.0V, and the discharge capacity was measured.

b) 4C Discharge

Each of the cells manufactured for the cell performance test was charged for 16 hours with a current of 120 mA, then discharged at 4800 mA until the discharge termination voltage reaches 1.0V, and the discharge capacity was measured

EXAMINATION RESULTS AND CONCLUSION

TABLE 1

| active materials | amount of Co (wt %) | concentration of NaOH (wt %) | heat treatment (°C.) | capacity per unit active material | high-rate discharge characteristics | |
|---|---|---|---|---|---|---|
| | | | | | 2C | 4C |
| A1 | 10 | 25 | 80 | 105 | 221 | 449 |
| A2 | 10 | 25 | 80 | 105 | 181 | 401 |
| A3 | 10 | 25 | 80 | 104 | 175 | 392 |
| A4 | 10 | 25 | 80 | 103 | 115 | 130 |
| Y | 10 | 25 | 80 | 100 | 100 | 100 |

Table 1 shows the results of the cell performance test of the active materials A1–A4 of Examples 1–4 and the active material Y of Comparative Example. Note here that values of the cell performance test are expressed as index numbers with the active material Y as the standard so that its capacity per unit active material and high-rate discharge characteristics are set at 100 in Table 1.

The active materials A1–A4 of Examples 1–4 exhibit higher values than the active material Y of Comparative Example in capacity per unit active material and high-rate discharge characteristics. This indicates it is preferable that nickel hydroxide particles should be continuously stirred during a heat treatment. The active materials A1–A3 exhibit particularly high values because high-order cobalt oxide forms an excellent conductive network. This network is considered to result from the fact that the nickel hydroxide crystal nucleuses are thoroughly coated with high-order cobalt oxide and that they do not need pulverizing since they hardly agglomerate. In contrast, the low values of the active materials A4 and Y are considered to result from pulverization, which causes high-order cobalt oxide coat to come off, leading to a decrease in the function of the conductive network.

A comparison among the active materials A1–A3 indicates that they exhibit similar values in the capacity per unit active material, and that the active material A1 exhibits the highest value in the high-rate discharge characteristics followed by the active materials A2 and A3. These results are considered to indicate that when an alkali aqueous solution is sprayed, the nickel hydroxide particles in the first embodiment are dispersed in the hot air most preferably, followed by those in the second and the third embodiments.

The active material A4 exhibits higher values than the active material Y both in the capacity per unit active material and in the high rate discharge characteristics. These results are considered to indicate that stirring active material during a heat treatment reduces the occurrence of agglomeration, which in turn reduces the coming off of a cobalt compound.

TABLE 2

| active materials | amount of Co (wt %) | concentration of NaOH (wt %) | heat treatment (°C.) | utilization factor of electrodes |
|---|---|---|---|---|
| B0 | 0.5 | 25 | 80 | 90 |
| B1 | 1 | 25 | 80 | 98 |
| B2 | 4 | 25 | 80 | 99 |
| B3 | 7 | 25 | 80 | 100 |
| B4 | 10 | 25 | 80 | 100 |
| B5 | 12.5 | 25 | 80 | 98 |
| B6 | 14 | 25 | 80 | 97 |
| B7 | 16 | 25 | 80 | 90 |

Table 2 shows the results of the electrode test of the active materials B0–B7 of Example 5. Note here that the values of the electrode test are expressed as index numbers with the active material B4, which is identical with the active material A1, as the standard value so that its utilization factor of an electrode is set at 100 in Table 2.

The active materials B1–B6 exhibit higher values than the active materials B0 and B7 in the utilization factors of electrodes. This result indicates that the preferable amount of cobalt in an active material is in the 1% by weight to 14% by weight range. It is considered that when the amount of cobalt is less than 1% by weight, conductive network is insufficient, whereas when the amount is over 14% be weight, the ratio of a nickel hydroxide to an active material decreases.

TABLE 3

| active materials | amount of Co (wt %) | concentration of NaOH (wt %) | heat treatment (°C.) | utilization factor of electrodes |
|---|---|---|---|---|
| C0 | 10 | 7 | 80 | 85 |
| C1 | 10 | 10 | 80 | 97 |
| C2 | 10 | 25 | 80 | 100 |
| C3 | 10 | 35 | 80 | 106 |
| C4 | 10 | 40 | 80 | 98 |
| C5 | 10 | 45 | 80 | 85 |

Table 3 shows the results of the electrode test of the active materials C0–C5 of Example 6. Note here that the values of the electrode test are expressed as index numbers with the active material C2, which is identical with the active material A1, as the standard value so that its utilization factor of an electrode is set at 100 in Table 3.

The active materials C1–C4 exhibit higher values than the active materials C0 and C5 in the utilization factors of electrodes. This result indicates that the preferable concentration of a sodium hydroxide to be sprayed is in the 10% by weight to 40% by weight range. It is considered that when the concentration is less than 10% by weight, an alkali aqueous solution cannot dissolve cobalt hydroxide sufficiently so that high-order cobalt hydroxide is not well manufactured, whereas when the concentration is over 40% be weight, an alkali aqueous solution has too high viscosity to penetrate an active material so that high-order cobalt hydroxide is not well manufactured.

TABLE 4

| active materials | amount of Co (wt %) | concentration of NaOH (wt %) | heat treatment (°C.) | utilization factor of electrodes |
|---|---|---|---|---|
| D0 | 10 | 25 | 35 | 83 |
| D1 | 10 | 25 | 40 | 95 |
| D2 | 10 | 25 | 70 | 99 |
| D3 | 10 | 25 | 80 | 100 |
| D4 | 10 | 25 | 120 | 99 |
| D5 | 10 | 25 | 150 | 93 |
| D6 | 10 | 25 | 160 | 71 |

Table 4 shows the results of the electrode test of the active materials D0–D6 of Example 7. Note here that the values of the electrode test are expressed as index numbers with the active material D3, which is identical with the active material A1, as the standard value so that its utilization factor of an electrode is set at 100 in Table 4.

The active materials D1–D5 exhibit higher values than the active materials D0 and D6 in the utilization factors of electrodes. This result indicates that the preferable temperature of a heat treatment is in the 40° C. to 150° C. range. It is considered that when the temperature is below 40° C., the alkali aqueous solution is too weak to fully dissolve cobalt hydroxide so that high-order cobalt hydroxide is not manufactured well, whereas when the temperature is over 150° C., the structure of a nickel hydroxide itself changes, deteriorating the active material.

It is considered that if punching metal impregnated with active material paste is used instead of foamed nickel electrodes impregnated with active material powder, the same results would be obtained in the aforementioned experiments.

OTHERS

In the first, second, and third embodiments, active materials are subjected to an additional heat treatment to complete an alkali heat treatment, after having been mixed with an alkali aqueous solution in hot air. However, this additional heat treatment is not essential to the present invention.

Besides the fluidized granulator, the kneader, and the mixer used in these embodiments, any other device can be used as far as an alkali heat treatment is conducted by stirring or dispersing nickel hydroxide particles while mixing them with an alkali aqueous solution. For example, an alkali aqueous solution may be sprayed on nickel hydroxide particles while stirring them in a rotating drum and then hot air may be supplied.

In these embodiments, an alkali heat treatment is given to nickel hydroxide particles which are composed of nickel hydroxide crystals in which a slight amount of zinc and cobalt is added as a solid-solution and cobalt hydroxide precipitate over the nickel hydroxide crystal surfaces. The alkali heat treatment can be performed in the same manner even if the nickel hydroxide crystals contain cadmium, or other elements as long as particles contain nickel hydroxide as a main component and a cobalt compound over their surfaces.

Although in these embodiments, a sodium hydroxide aqueous solution is used as an alkali aqueous solution for an alkali heat treatment, a potassium hydroxide aqueous solution may be used instead. In addition, a sodium hydroxide aqueous solution or a potassium hydroxide aqueous solution in which a small amount of lithium hydroxide is added may be used instead.

As explained hereinbefore, in the active material manufacturing method of the present invention, the occurrence of agglomeration of the nickel hydroxide particles during an alkali heat treatment is prevented. Consequently, the cobalt compound which coats the nickel hydroxide particle surfaces is prevented from coming off in part during the pulverization.

As a result, the cell characteristics including the utilization factor of an active material and high-rate discharge characteristics are improved as compared with those of cells containing active materials manufactured in conventional manufacturing methods.

The present invention also makes it possible to perform an alkali heat treatment continuously as in the third embodiment. In conclusion, the present invention is a valuable technique to increase the capacity of alkaline storage cells.

Although the present invention has been fully descried by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method of making a nickel electrode active material for use in an alkaline storage cell, which comprises:

spraying particles composed of nickel hydroxide coated with a cobalt compound, said particles being held on a porous holder, with an alkali in aqueous solution; and supplying air through pores of the holder to stir and heat the particles being sprayed with the aqueous solution to a temperature between 40° and 150° C.

2. The method according to claim 1, which further comprises mechanically stirring the particles held on the porous holder.

3. The method according to claim 1, wherein the nickel hydroxide is coated between 1 and 14% by weight of the cobalt compound, as cobalt oxide.

4. The method according to claim 1, wherein the aqueous solution contains between 10 and 40% by weight of the alkali.

* * * * *